(12) United States Patent
Yamaguchi et al.

(10) Patent No.: US 10,268,281 B2
(45) Date of Patent: Apr. 23, 2019

(54) TRANSMISSION MEMBER, IRRADIATION DEVICE AND ELECTRONIC PEN

(71) Applicant: FUJI XEROX CO., LTD., Tokyo (JP)

(72) Inventors: Yoshinori Yamaguchi, Yokohama (JP); Kazushige Ooi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/240,431

(22) Filed: Aug. 18, 2016

(65) Prior Publication Data
US 2017/0205902 A1 Jul. 20, 2017

(30) Foreign Application Priority Data
Jan. 14, 2016 (JP) ................................. 2016-005147

(51) Int. Cl.
*G06F 3/03* (2006.01)
(52) U.S. Cl.
CPC .................. *G06F 3/0317* (2013.01)
(58) Field of Classification Search
CPC .... G06F 3/0317; G06F 3/03; G02F 1/133611; G02F 1/133604; G02F 2001/133607; F21V 5/052; G02B 6/0051
USPC ..................... 345/179–183; 178/18.09, 19.05
See application file for complete search history.

(56) References Cited

U.S. PATENT DOCUMENTS

| | | | | | |
|---|---|---|---|---|---|
| 4,710,760 | A | * | 12/1987 | Kasday | G06F 3/0421 178/18.09 |
| 5,676,453 | A | * | 10/1997 | Parkyn, Jr. | F24S 23/31 362/260 |
| 6,220,736 | B1 | * | 4/2001 | Dobler | F21S 41/28 362/539 |
| 6,989,929 | B2 | * | 1/2006 | Watanabe | G02B 3/08 359/457 |
| 7,063,448 | B2 | * | 6/2006 | Kang | F21V 5/02 362/330 |
| 7,629,968 | B2 | * | 12/2009 | Miller | G06F 3/0428 345/173 |
| 8,624,853 | B2 | * | 1/2014 | Han | G06F 3/042 178/18.09 |
| 2005/0286145 | A1 | * | 12/2005 | Silhengst | F21V 5/045 359/742 |
| 2009/0261237 | A1 | * | 10/2009 | Backes | B60S 1/0837 250/227.11 |

(Continued)

FOREIGN PATENT DOCUMENTS

| | | |
|---|---|---|
| JP | 3153412 B2 | 4/2001 |
| JP | 2006-260345 A | 9/2006 |
| WO | WO 2007003682 A1 * 1/2007 | .......... G06F 1/1626 |

*Primary Examiner* — Lunyi Lao
*Assistant Examiner* — Jarurat Suteerawongsa
(74) *Attorney, Agent, or Firm* — Oliff PLC

(57) ABSTRACT

According to an aspect of the invention, an atransmission member includes plural first surfaces disposed side by side in a width direction of an optical path from a light source to an irradiation target, the plural first surfaces refracting light from the light source entering each of the first surfaces in a direction toward the irradiation target; a second surface interposed between the first surfaces adjacent to each other to form first highs and lows together with the adjacent first surfaces; and a third surface from which light refracted on the first surfaces exits, second highs and lows having a smaller interval than an interval of the first highs and lows being provided on the third surface.

8 Claims, 16 Drawing Sheets

(56) References Cited

U.S. PATENT DOCUMENTS

2013/0153787 A1\* 6/2013 Geaghan ............... G06F 3/0317
250/458.1

\* cited by examiner

TRANSMISSION MEMBER, IRRADIATION DEVICE AND ELECTRONIC PEN

CROSS-REFERENCE TO RELATED APPLICATIONS

This application is based on and claims priority under 35 USC 119 from Japanese Patent Application No. 2016-005147 filed Jan. 14, 2016.

BACKGROUND

Field of the Invention

The present invention relates to a transmission member, an irradiation device, and an electronic pen.

SUMMARY

According to an aspect of the invention, there is provided a transmission member including: plural first surfaces disposed side by side in a width direction of an optical path from a light source to an irradiation target, the plural first surfaces refracting light from the light source entering each of the first surfaces in a direction toward the irradiation target; a second surface interposed between the first surfaces adjacent to each other to form first highs and lows together with the adjacent first surfaces; and a third surface from which light refracted on the first surfaces exits, second highs and lows having a smaller interval than an interval of the first highs and lows being provided on the third surface.

BRIEF DESCRIPTION OF THE DRAWINGS

Exemplary embodiments of the present invention will be described in detail based on the following figures, wherein.

DETAILED DESCRIPTION

[1] Example

Figure 1:
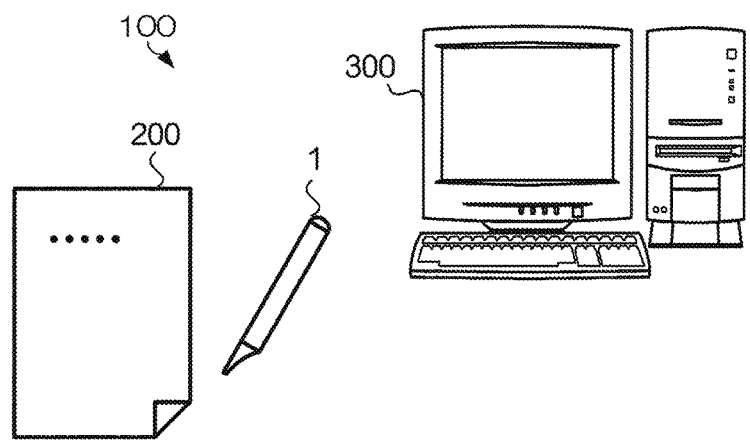
FIG. 1 is a diagram illustrating an overall configuration of an electronic pen system according to Example.

FIG. 1 illustrates an overall configuration of an electronic pen system 100 according to Example. The electronic pen system 100 includes an electronic pen 1, a medium 200, and a personal computer (PC) 300. The electronic pen 1 implements a function of writing a character, a figure, or the like on the medium 200 by user's hand, and a function of capturing an encoded image formed on the medium 200. The encoded image formed on the medium 200 is obtained by encoding and imaging information according to a determined encoding scheme.

The medium 200 may be made of plastic such as paper, an OHP sheet or another material, and may be electronic paper on which displayed content is electrically rewritten. When information is decoded from an encoded image at a position designated by the electronic pen 1, the PC 300 executes processing using the decoded information. For example, the PC 300 computerizes written content written by user's hand using the electronic pen 1, and generates electronic data that indicates an electronic document.

Figure 2:
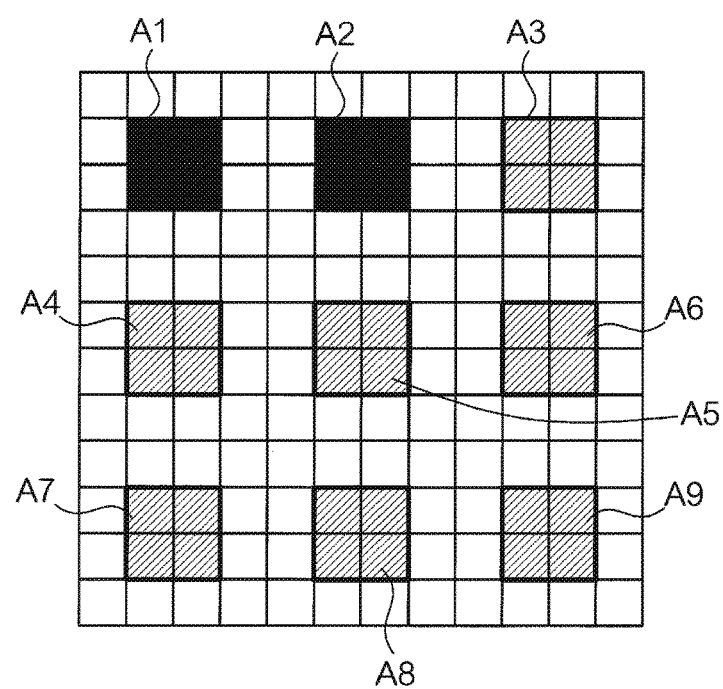
FIG. 2 is a diagram for description of an encoded image.

FIG. 2 is a diagram for description of the encoded image. As illustrated in FIG. 2, the encoded image includes a set of plural dot images. Referring to FIG. 2, rectangular regions A1 and A2 indicated in black correspond to regions in which the dot images are disposed, and regions A3 to A9 indicated by diagonal lines correspond to regions in which the dot images are not disposed. The encoded image is an image that represents identification information identifying the medium 200 or position information indicating a position on the medium 200, and information is represented according to an arrangement pattern of the dot images.

Figure 3A:
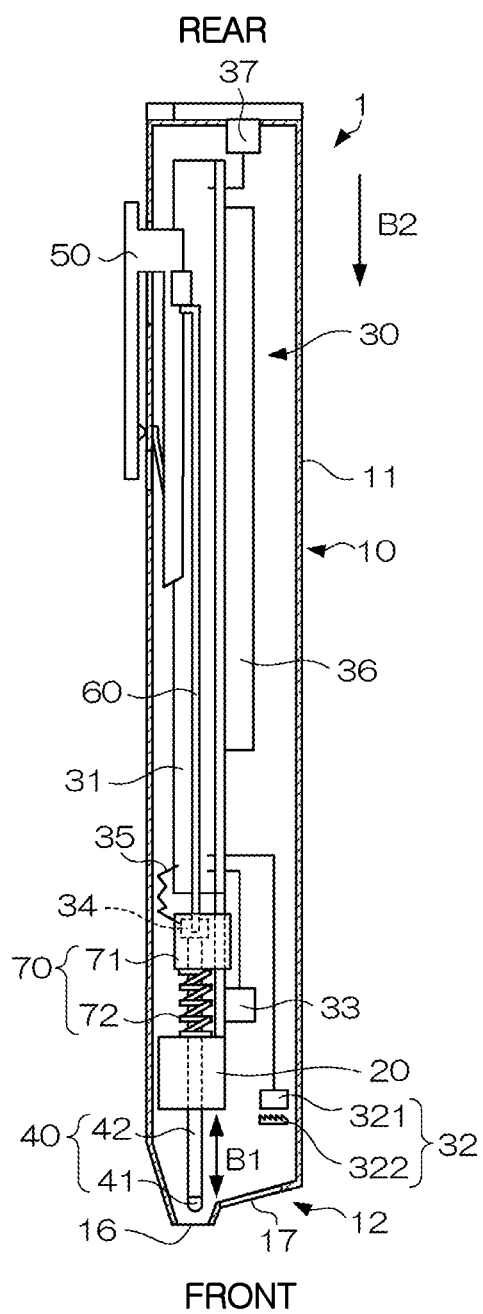
FIGS. 3A and 3B are diagrams illustrating a configuration of an electronic pen.
Figure 3B:
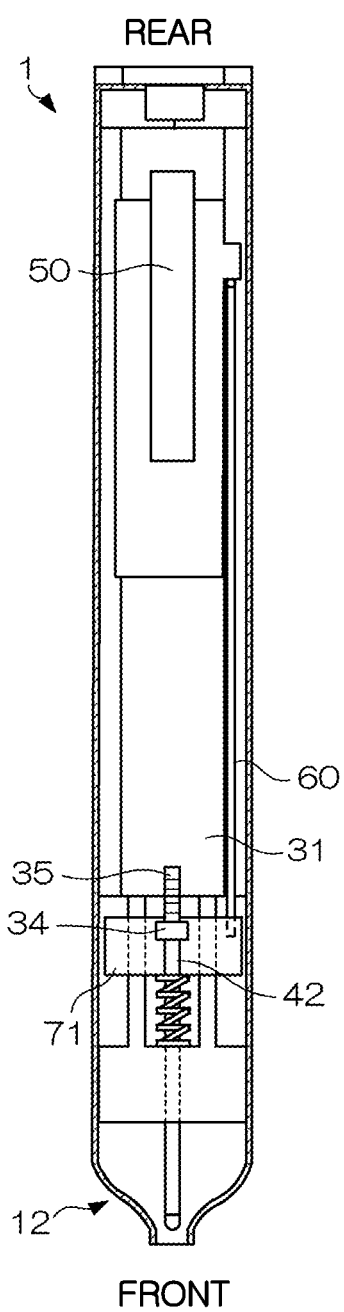

FIGS. 3A and 3B illustrate a configuration of the electronic pen 1. The electronic pen 1 includes a housing 10, a frame 20, an electronic part group 30, a refill 40, a knock member 50, a shaft 60, and a support member 70. FIG. 3A illustrates the electronic pen 1 viewed in a width direction, and FIG. 3B illustrates the electronic pen 1 when the knock member 50 is viewed from a front. Referring to the electronic pen 1, a side to which a pen point 41 described below is attached is referred to as a front, and an opposite side to the front is referred to as a rear.

The housing 10 is a long member having a portion that forms a tube, and is formed using a nonmetallic material (for example, a resin material). Respective parts included in the electronic pen 1 are stored inside the housing 10. The housing 10 includes a cylindrical portion 11 having a cylindrical shape, and a leading end portion 12 formed at a front of the cylindrical portion 11. Here, the leading end portion 12 has a tapering shape, and the pen point 41 described below protrudes therefrom. An opening 16 serving as a passage when the pen point 41 described below protrudes from the housing 10, and an opening 17 serving as a passage of light when the above-described encoded image is captured are formed in the leading end portion 12.

The frame 20 is a structure fixed to the housing 10 to support the electronic part group 30. The electronic part group 30 corresponds to plural electronic parts for implementing the function of capturing the above-described encoded image by the electronic pen 1. The electronic part group 30 includes a substrate 31, an irradiation device 32, an image capturing device 33, a pressure sensor 34, a flexible printed circuit board 35, a battery 36, and a universal serial bus (USB) terminal 37.

The substrate 31 includes an operational unit, a memory, and the like having a central processing unit (CPU) or an application specific integrated circuit (ASIC), and performs a process of managing a power source of the electronic pen 1, a process of controlling driving of the irradiation device 32 and the image capturing device 33, a process of capturing an encoded image, a process of transmitting the captured encoded image to the PC 300, or and the like.

The irradiation device 32 includes a light source 321 and a transmission member 322. The light source 321 irradiates the transmission member 322 with light. The transmission member 322 guides light emitted from the light source 321 to the opening 17 and in a direction toward the medium to be irradiated. In this Example, a light emitting diode (LED) is used as the light source 321. The irradiation device 32 will be described below in detail. The image capturing device 33 includes a lens, a narrowing unit, a reflector, an image sensor, or the like, and captures a subject (for example, the above-described encoded image) by receiving light entering from the opening 17.

The pressure sensor 34 measures a force at which the pen point 41 described below is pressed. The force at which the pen point 41 is pressed refers to a pressure applied to the pen point 41 which is pressed against the medium at the time of wiring using the electronic pen 1, that is, a writing pressure. The flexible printed circuit board 35 is a circuit board that maintains an electrical characteristic even when a deformation is repeatedly applied thereto. The flexible printed circuit board 35 electrically connects the substrate 31 and the pressure sensor 34 to each other. For example, the battery 36 is a rechargeable battery. The battery 36 supplies power for driving the electronic pen 1 to respective parts of the electronic pen 1.

The USB terminal 37 is a female terminal in accordance with standards of a USB, and is provided in a rear end portion of the housing 10 and electrically connected to the substrate 31. When a male USB terminal is inserted, the USB terminal 37 electrically connects the substrate 31 to an external device connected through the USB terminal. In this way, the external device and the substrate 31 communicate with each other, or power supplied from the external device is supplied to the substrate 31.

The refill 40 is a so-called spare lead, and may be removed from the electronic pen 1 and replaced with another refill 40. The refill 40 is a straight rod-shaped member, and is supported by the support member 70 described below such that the refill 40 is movable in a longitudinal direction B1 indicated by an arrow in the figure. The longitudinal direction B1 is a direction along a long side of the rod-shaped refill 40. The refill 40 has the pen point 41 at the front, and has an ink storing section 42 behind the pen point 41.

The pen point 41 is disposed at a position that protrudes from the opening 16 when the refill 40 moves in the longitudinal direction B1. The ink storing section 42 has a shape of a rotating body (specifically a cylinder), an axis of which is along the longitudinal direction B1, and stores ink supplied to the pen point 41 inside the ink storing section 42 which is hollow. FIGS. 3A and 3B illustrate a state in which the pen point 41 is put inside the housing 10. However, when the pen point 41 protrudes from the housing 10 by moving in a direction from the rear toward the front of the electronic pen 1 (a direction toward the front along the longitudinal direction B1), the pen point 41 is pressed against the medium to perform a writing operation, thereby ejecting ink from the pen point 41 to draw a character or a pattern.

The knock member 50 is a member to which a force is applied such that the pen point 41 protrudes outward from the housing 10. The knock member 50 contacts with an external object (for example, a finger of a user) at a rear of the refill 40, and a force from the object is applied thereto. The knock member 50 delivers a force applied from the outside to the shaft 60.

The shaft 60 is a thin rod-shaped member formed using steel use stainless (SUS), and the like. The shaft 60 transfers a force received from the outside at a rear of the refill 40 (a force received by the knock member 50 from the outside) to move the refill 40 in the longitudinal direction B1. When a force that points toward the front is applied to the knock member 50, the force is delivered to the shaft 60 from the knock member 50, and the shaft 60 moves to the front. A front end of the shaft 60 is fixed to the support member 70.

The refill 40 is fixed to the support member 70, and the support member 70 is a member that supports the refill 40 such that the refill 40 is moveable in the longitudinal direction B1 by moving using the frame 20 as a guide. The support member 70 includes a slider 71 and a spring 72. The slider 71 is guided by the frame 20 to move along the longitudinal direction B1. A rear end of the refill 40 is fixed to the slider 71, and the front end of the shaft 60 is fixed to the slider 71. For this reason, when the shaft 60 moves to the front, the slider 71 moves to the front, and the refill 40 moves to the front accordingly.

The pressure sensor 34 is provided in the slider 71. The pressure sensor 34 is provided at a position that contacts with the rear end of the refill 40. For this reason, when the pen point 41 of the refill 40 is pressed against the medium, a reaction force from the medium with respect to a pressure (writing pressure) applied to the medium by the pen point 41 is delivered to the pressure sensor 34 through the refill 40 and measured as a pressure.

A front end of the spring 72 contacts with the frame 20, and the spring 72 does not move further forward. In addition, a rear end of the spring 72 contacts with the slider 71 to apply a rearward force to the slider 71. In this way, even when a front side of the electronic pen 1 is directed in a vertical direction, the refill 40 does not protrude. However, when a force is applied to the knock member 50, the shaft 60 and the support member 70 move forward, and the pen point 41 of the refill 40 protrudes from the housing 10.

Figure 4A:
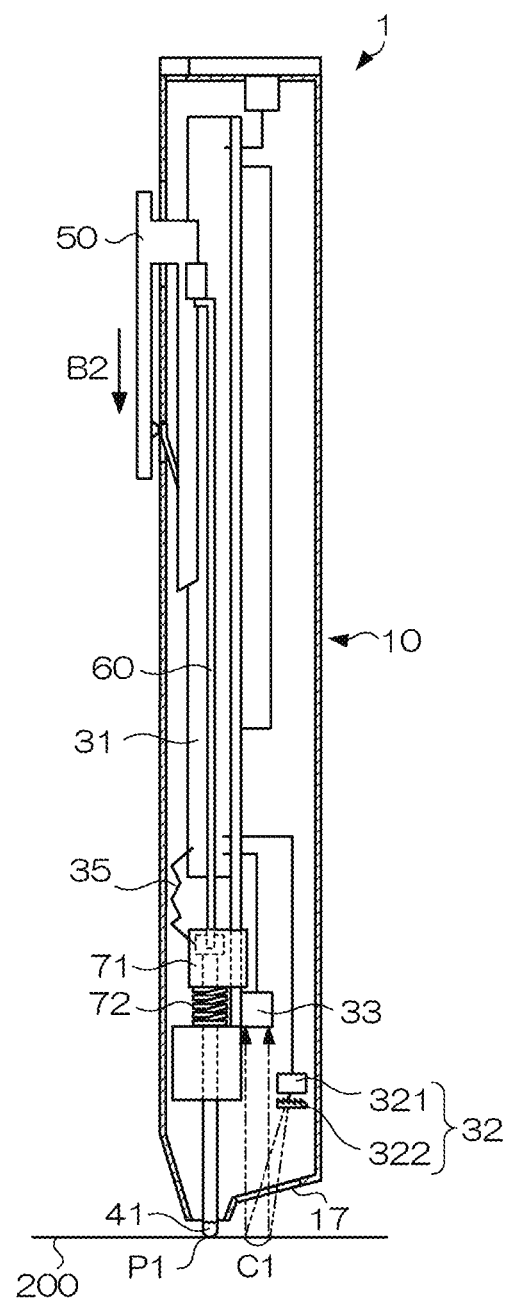
FIGS. 4A and 4B are diagrams illustrating an electronic pen in a state in which a pen point protrudes.
Figure 4B:
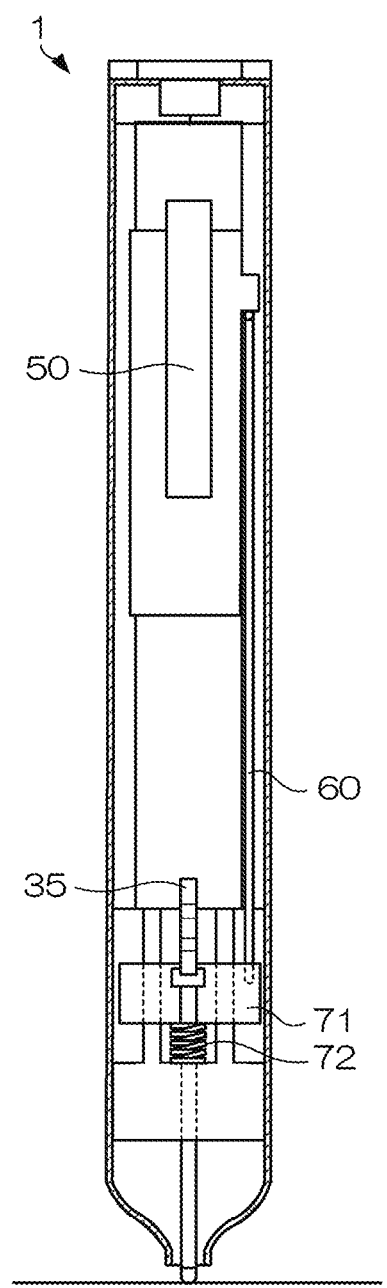

FIGS. 4A and 4B illustrate the electronic pen 1 in a state in which the pen point 41 protrudes. When the knock member 50 moves forward as illustrated in FIGS. 4A and 4B, a switch for starting the substrate 31 is pressed by the knock member 50, and power is supplied to respective parts of the electronic part group 30. Power is supplied to the pressure sensor 34 through the flexible printed circuit board 35. In addition, a signal from the pressure sensor 34 is delivered to the substrate 31 through the flexible printed circuit board 35.

FIGS. 4A and 4B illustrate a state in which the pen point 41 is pressed against the medium 200. In this state, the pressure sensor 34 measures a writing pressure, and a value of the measured writing pressure is supplied to the substrate 31 through the flexible printed circuit board 35. For example, a control operation is performed such that the substrate 31 drives the irradiation device 32 and the image capturing device 33 when a writing pressure greater than or equal to a threshold value is measured. In this way, infrared light emitted by the irradiation device 32 arrives at a region C1 of the medium 200 by passing through the opening 17. When the medium 200 has a diffusing and reflecting surface such as paper, infrared light (diffused and reflected light) diffused and reflected in the region C1 arrives at the image capturing device 33. This diffused and reflected light represents an encoded image formed in the region C1.

The region C1 is a region on the medium 200 which is present at a position corresponding to a contact position P1 at which the pen point 41 contacts with the medium 200. Specifically, the region C1 is present at a position shifted from the contact position P1 by a distance between the refill 40 and the image capturing device 33 in a direction from the refill 40 toward the image capturing device 33. The image capturing device 33 captures an image in the region C1 based on light emitted to the medium 200 by the irradiation device 32 and reflected in the region C1. Since the above-described encoded image (an image obtained by encoding information that represents a position on the medium 200) is formed on the medium 200, the image capturing device 33 captures the encoded image formed in the region C1.

The image capturing device 33 performs this capturing at a predetermined frame rate (for example, 60 frames per second (fps)). The substrate 31 performs a process of decoding information represented by the captured encoded image from the encoded image, and extracting identification information and position information. A widely known technology such as a technique disclosed in JP-A-2013-152705 may be used for extraction. The substrate 31 transmits the extracted information to the PC 300. In this way, the substrate 31 is a processing device that performs a process with respect to an image captured by the image capturing device 33.

A description will be given of a configuration in which the irradiation device 32 irradiates the region C1 with light will be described with reference to FIGS. 5 to 7.

Figure 5:
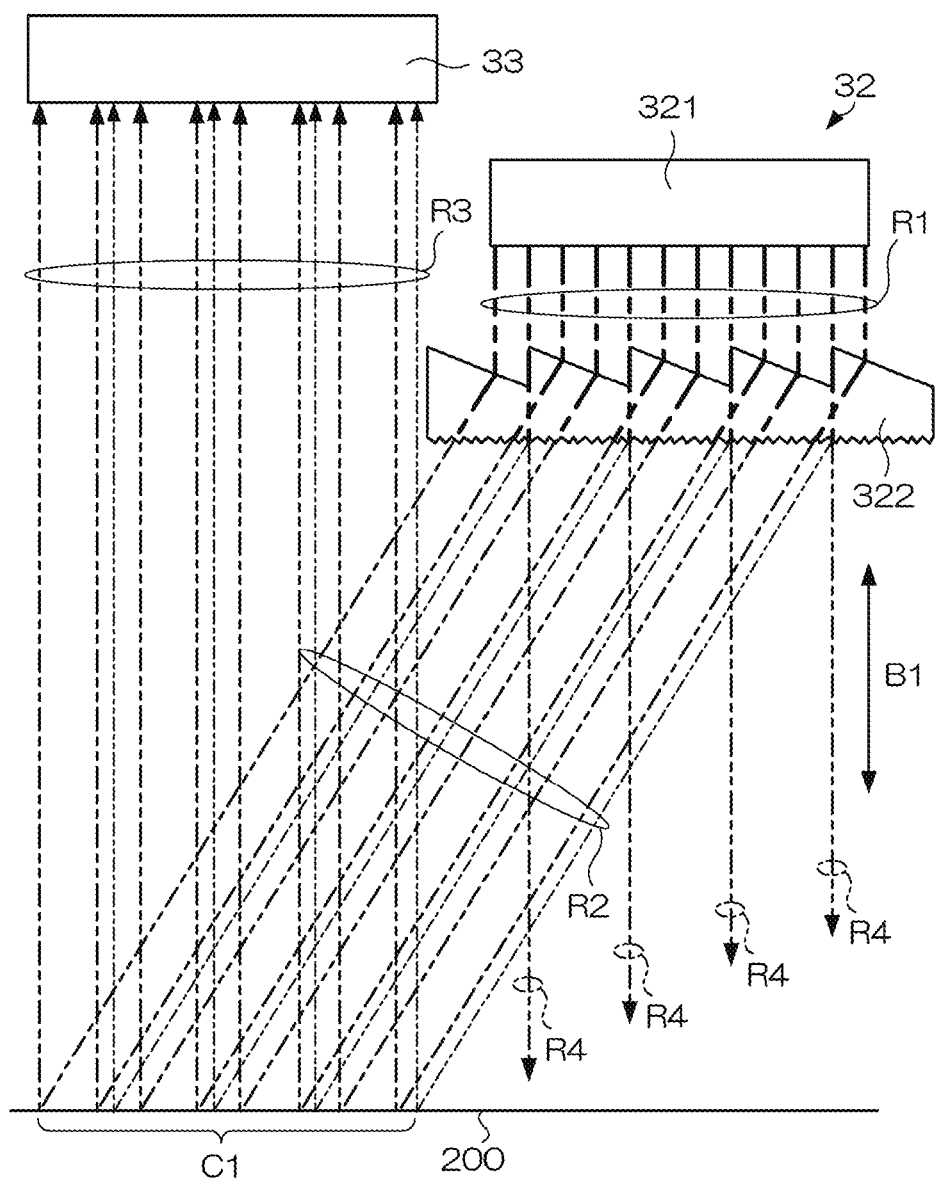
FIG. 5 is a diagram illustrating an irradiation device and an image capturing device in an enlarged manner.

FIG. 5 illustrates the irradiation device 32 and the image capturing device 33 in an enlarged manner. The light source 321 emits light that travels in a direction along the longitudinal direction B1 of the refill 40. Irradiation light emitted from the light source 321 straightly travels in the longitudinal direction B1, enters the transmission member 322 by traveling through an optical path R1 to the transmission member 322, and exits the transmission member 322 by passing through an inside of the transmission member 322. The irradiation light exiting the transmission member 322 arrives at the image capturing device 33 by traveling through an optical path R2 to the region C1 and an optical path R3 from the region C1 to the image capturing device 33 after exiting the transmission member 322.

Figure 6:
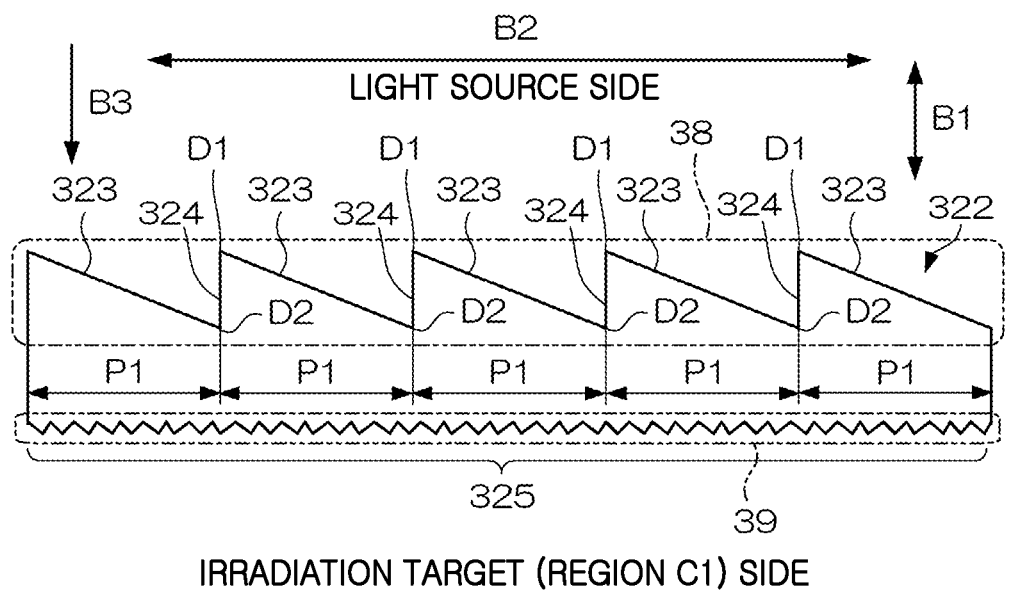
FIG. 6 is a diagram illustrating a transmission member in an enlarged manner.

FIG. 6 illustrates the transmission member 322 in an enlarged manner. The transmission member 322 has plural first surfaces 323 and plural second surfaces 324 on the light source 321 side, and has a third surface 325 on an irradiation target (the region C1 in this Example) side. The plural first surfaces 323 are disposed side by side in a width direction B2 of an optical path from the light source 321 to the irradiation target (the optical path R1 illustrated in FIG. 5) to refract irradiation light from the light source 321 entering the respective first surfaces 323 in a direction toward the irradiation target (region C1).

In this Example, the transmission member 322 has five first surfaces 323. The respective first surfaces 323 have a common dimension in the width direction B2 and a common dimension in the longitudinal direction B1. In addition, the respective first surfaces 323 are directed in a common direction. Each of the plural second surfaces 324 is a surface interposed between first surfaces 323 adjacent to each other. In this Example, four second surfaces 324 are formed by being interposed among the five first surfaces 323.

The respective second surfaces 324 are surfaces along a light travel direction B3 (a direction along the longitudinal direction B1 in this Example) in which irradiation light from the light source 321 travels. In other words, respective normal lines of the respective second surfaces 324 are perpendicular to the light travel direction B3. The second surface 324 forms a first sharp corner portion D1 with one of first surfaces 323 adjacent to the second surface 324, and forms a second caved corner portion D2 with the other one of the first surfaces 323. In this way, the second surfaces 324 together with the adjacent first surfaces 323 form first highs and lows (undulations) 38. As illustrated in FIG. 6, the first highs and lows 38 have a shape of teeth of a saw. A distance between adjacent first corner portions D1 or a distance between adjacent second corner portions D2 of the first highs and lows 38, that is, an interval (pitch) of the first highs and lows 38 is an interval P1.

The third surface 325 is a surface from which light refracted on the first surfaces 323 exits, and is a surface having a rough surface. The rough surface refers to a surface on which highs and lows are provided. For example, the rough surface is formed using a method such as a sand blasting method or a honing method. Second highs and lows 39 are provided on the third surface 325.

Figure 7:
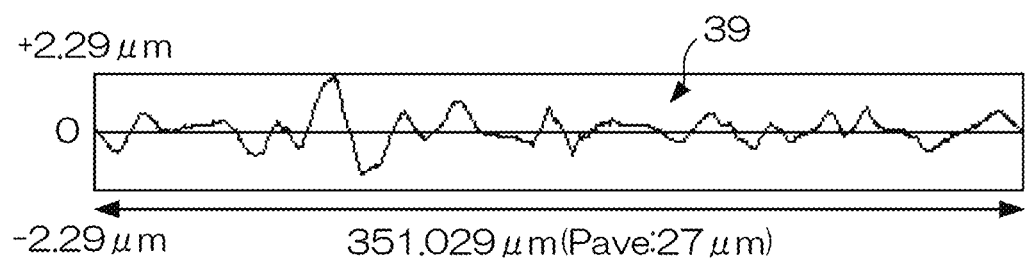
FIG. 7 is a diagram illustrating a third surface in an enlarged manner.

FIG. 7 illustrates the third surface 325 in an enlarged manner. FIG. 7 illustrates a portion of the third surface 325 having a width of 351.029 µm. The second highs and lows 39, a displacement of which from a reference plane (displacement=0 µm) is included in a range from −2.29 µm to +2.29 µm, are provided on the third surface 325 in this portion. An average Pave of intervals between sharp portions or caved portions of the second highs and lows 39, that is, intervals (pitches) of the second highs and lows 39 is 27 µm. Pave is smaller than the interval P1 of the first highs and lows 38 illustrated in FIG. 6, and more specifically, is smaller than or equal to one tenth of the interval P1.

Returning to FIG. 6, a rough surface, that is, the second highs and lows 39 are provided on the entire third surface 325 in the width direction B2 of the optical path R1. For this reason, a region of the third surface 325 from which light refracted on the first surfaces 323 exits is the second highs and lows 39. In addition, the second highs and lows 39 are provided in a region of the third surface 325 from which light entering a gap between first surfaces 323 adjacent to each other when viewed from the light source 321 side exits. The gap will be described with reference to FIG. 8.

Figure 8:
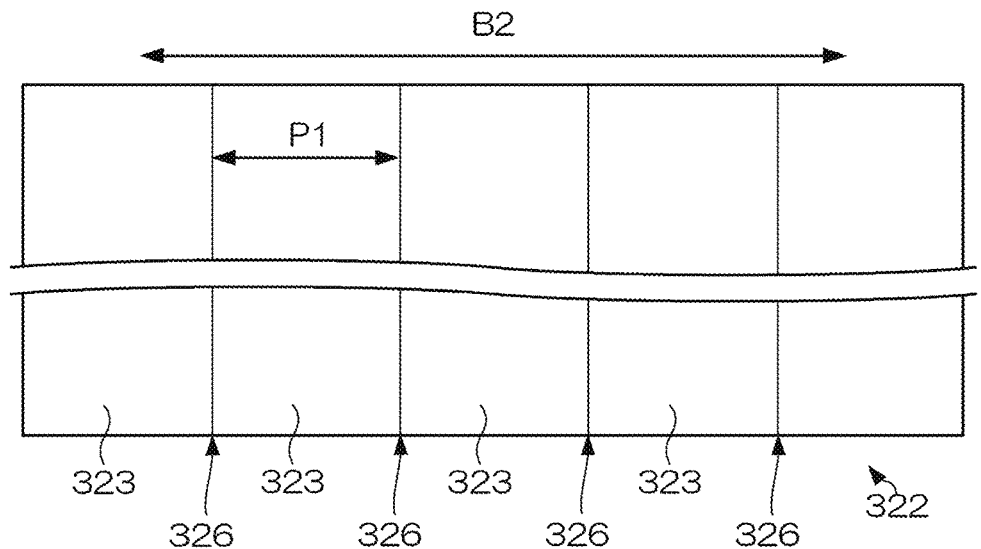
FIG. 8 is a diagram illustrating the transmission member viewed from a light source side.

FIG. 8 illustrates the transmission member 322 viewed from the light source 321 side. The respective first surfaces 323 have rectangular shapes. For this reason, a gap 326 between adjacent first surfaces 323 has a shape of a straight line when viewed from the light source side. The second surfaces 324 are disposed in respective gaps 326. However, in FIG. 8, the second surfaces 324 are viewed in a direction along the surfaces, and thus the second surfaces 324 overlap the gaps 326. Therefore, irradiation light entering the gap 326 travels in a direction along the second surface 324, and thus passes through the gap 326 without entering the second surface 324 and without being reflected on the second surface 324 as illustrated in FIG. 5.

Figure 9:
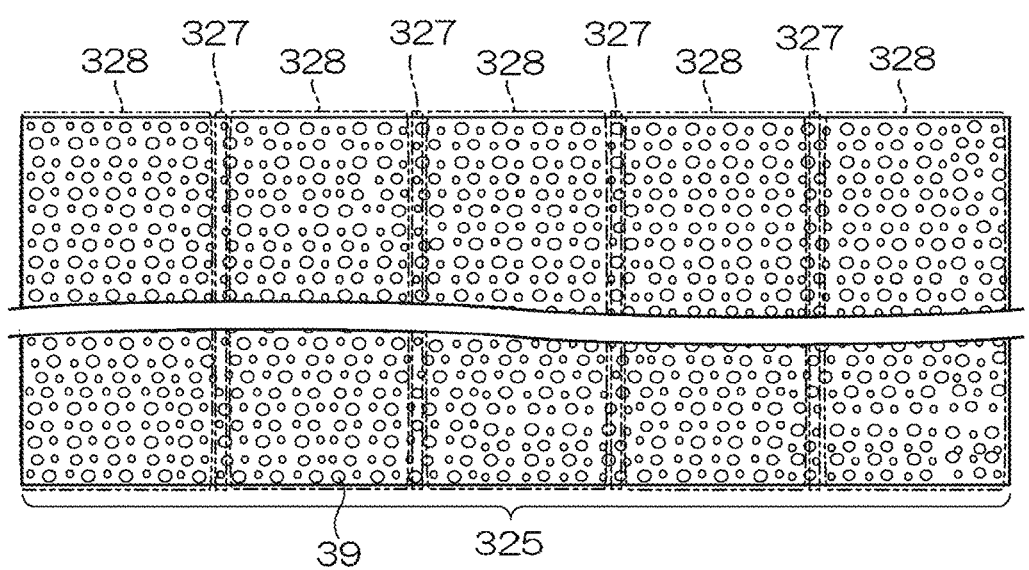
FIG. 9 is a diagram illustrating the transmission member viewed from an opposite side to the light source side.

FIG. 9 illustrates the transmission member 322 viewed from an opposite side to the light source 321. The third surface 325 includes a first region 327 from which light entering the gap 326 illustrated in FIG. 8 exits, and a second region 328 other than the first region 327. In the transmission member 322, the second highs and lows 39 are provided in the first region 327. For this reason, as illustrated in FIG. 5, while a portion of irradiation light passing through the gap 326 straightly exits from the first region 327 and travels through an optical path R4, a portion of light refracted on the second highs and lows 39 travels through the second optical path R2 and arrives at the image capturing device 33 through the optical path R3.

In addition, in the transmission member 322, the second highs and lows 39 are provided in the second region 328. For this reason, when irradiation light refracted on the first surfaces 323 passes through the third surface 325, a portion of the irradiation light is refracted and exits in a direction other than a direction of the optical path R2. For this reason, a portion of the irradiation light refracted on the first surfaces 323 does not arrive at the image capturing device 33. The above-described mode in which irradiation light travels in the transmission member 322 will be compared with a case in which the second highs and lows 39 are not provided on the third surface, and the surface is a flat surface.

Figure 10:
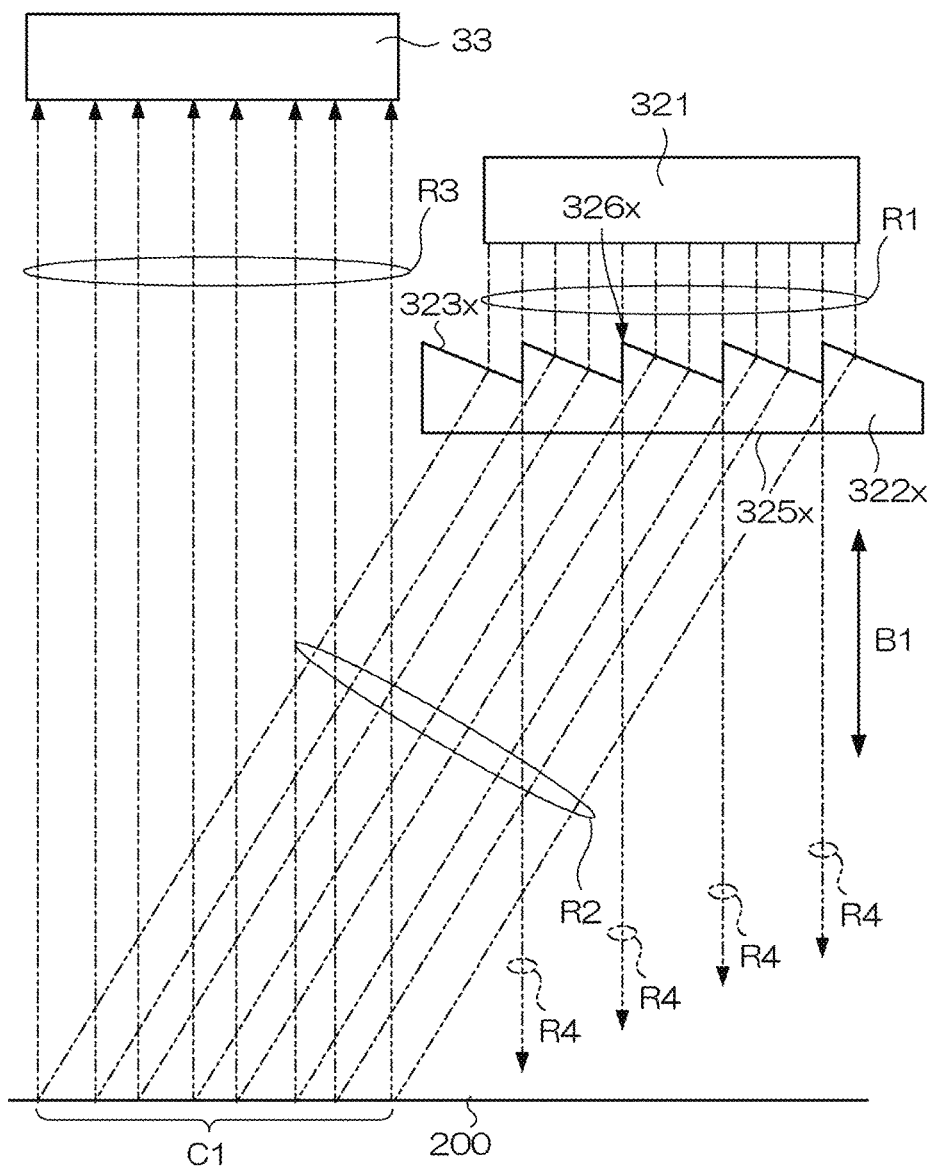
FIG. 10 is a diagram illustrating an example of an optical path when the third surface is a flat surface.

FIG. 10 illustrates an example of an optical path when the third surface is a flat surface. FIG. 10 illustrates a transmission member 322x that includes a third flat surface. Irradiation light from the light source 321 entering a first surface 323x of the transmission member 322x through the optical path R1 is refracted on the first surface 323x, and then exits from a third flat surface 325x to arrive at the image capturing device 33 through the optical path R2 and the optical path R3. In addition, irradiation light entering a gap 326x between first surfaces 323x adjacent to each other straightly exits to travel through the optical path R4 without being refracted on the third surface 325x.

Figure 11A:
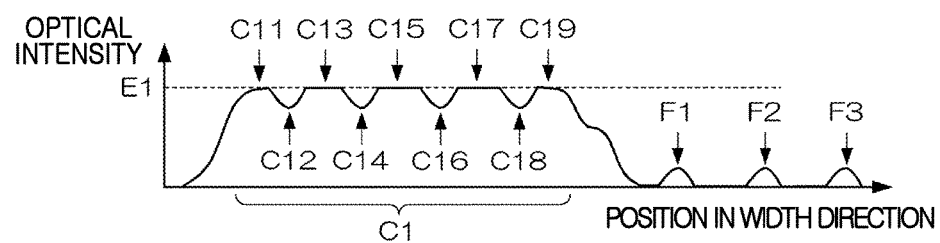
FIGS. 11A and 11B are diagrams illustrating an example of a measurement result of intensity of light arriving at a medium.
Figure 11B:
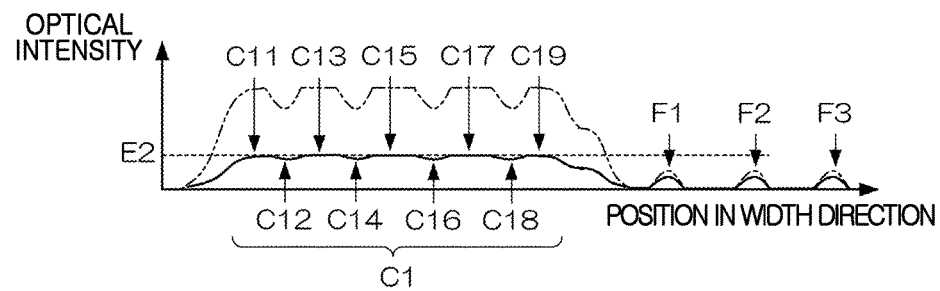

FIGS. 11A and 11B illustrate an example of a measurement result of intensity of light arriving at the medium 200. In FIGS. 11A and 11B, a vertical axis represents optical intensity, and a horizontal axis represents a position on the medium 200. FIG. 11A illustrates optical intensity when irradiation light penetrates the transmission member 322x illustrated in FIG. 10. In the region C1 corresponding to an irradiation target, optical intensity in four regions C12, C14, C16, and C18 corresponding to the gap 326x (region at which irradiation light passing through the gap 326x arrives when irradiation light is presumed to be refracted on the first surface 323x) is smaller than optical intensity E1 in regions C11, C13, C15, C17, and C19 at which light refracted on the first surface 323x arrives. Accordingly, optical intensity is measured in regions F1, F2, and F3 at fronts in the optical path R4. It is presumed that the optical path R4 at a front of the region F3 is blocked by the housing 10, and thus irradiation light does not arrive at the medium 200.

FIG. 11B illustrates optical intensity when irradiation light penetrates the transmission member 322 illustrated in FIG. 5 and the like (a two-dot chain line indicates optical intensity of FIG. 11A). In the transmission member 322, a portion of irradiation light refracted on the first surfaces 323 is refracted on the third surface 325, and thus optical intensity in the regions C11, C13, C15, C17, and C19, which is the optical intensity E1 in FIG. 11A, is E2 which is smaller than E1. In addition, a portion of irradiation light passing through the gap 326 is refracted in the regions F1, F2, and F3. Thus, optical intensity in the regions F1, F2, and F3 is smaller than that in the example of FIG. 11A. On the other hand, a portion of irradiation light passing through the gap 326 arrives at the regions C12, C14, C16, and C18. Thus, a difference in optical intensity between the regions C12, C14, C16, and C18 and the regions C11, C13, C15, C17, and C19 is smaller than that in the example of FIG. 11A.

In this way, according to this Example, a variation in intensity of irradiation light from the light surface 321 arriving at the irradiation target (non-uniformity of an irradiation distribution) according to position is suppressed by providing the second highs and lows 39 in both the first region 327 and the second region 328 illustrated in FIG. 9 when compared to a case in which these regions (that is, the entire third surface) are flat surfaces. For example, while a possibility that decoding of information from an encoded image will fail due to non-uniformity of an irradiation distribution is about 5% to 20% when the entire third surface is a flat surface, the possibility is reduced to 5% or less when the third surface is a rough surface.

In addition, in this Example, irradiation light straightly passes through the gap 326. However, a larger amount of light entering the gap 326 is directed to the region C1 corresponding to an irradiation target by providing the second highs and lows 39 in the first region 327 when compared to a case in which the second highs and lows 39 are not provided in the first region 327.

In addition, for example, a configuration in which one reflecting surface is obliquely disposed with respect to an irradiation direction in which irradiation light is emitted (a direction in which light travels through the optical path R1 in this Example) may be considered as a comparative configuration in order to guide irradiation light from the light source 321 to the irradiation target. However, in the comparative configuration, the reflecting surface greater than a dimension of the optical path of the irradiation light in a width direction is obliquely disposed with respect to the irradiation direction, and thus a dimension of the reflecting surface in the irradiation direction is easily increased. On the other hand, in this Example, irradiation light is refracted on the plural first surfaces arranged side by side in the width direction of the optical path, and thus a dimension of the first surfaces in the irradiation direction may be smaller than a dimension of the reflecting surface of the comparative configuration in the irradiation direction. Therefore, referring to a device that guides light from a light source to an irradiation target, this Example may miniaturize the device when compared to a case in which one reflecting surface is disposed in an optical path.

In addition, for example, when the electronic pen includes the transmission member 322x illustrated in FIG. 10, a transmission member corresponding to the transmission member 322 of this Example is configured by forming a rough surface on the third surface 325x using the above-mentioned method such as the sand blasting method or the honing method. For this reason, a variation in intensity of irradiation light according to position may be suppressed without additionally providing a member. In addition, since the method of forming the rough surface is a general method, cost is suppressed when compared to a case in which a particular method is necessary.

[2] Modified Examples

The above-described Example is merely an example of implementation of the invention, and may be modified as below. In addition, Example and modified examples may be combined and implemented as necessary.

[2-1] Region in which Second Highs and Lows are Provided

In Example, the second highs and lows 39 are provided in the whole second region 328 illustrated in FIG. 9. However, the invention is not limited thereto.

Figure 12:
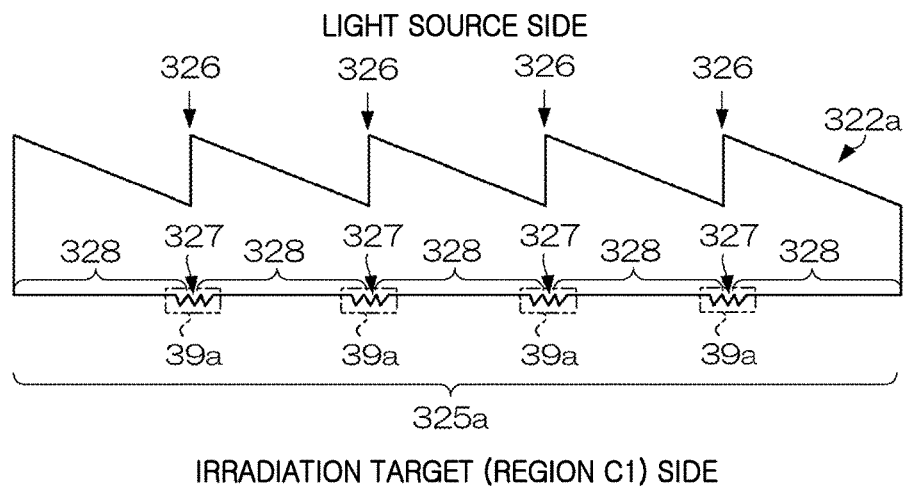
FIG. 12 is a diagram illustrating a transmission member of a modified example.

FIG. 12 illustrates a transmission member 322a of the present modified example. The transmission member 322a has a third surface 325a. On the third surface 325a, second highs and lows 39a are provided in a first region 327 from which light entering the gap 326 exits. Meanwhile, the third surface 325a has a flat surface in a second region 328 other than the first region 327. Strictly, even though the second highs and lows 39a are provided at an end portion of the second region 328 on the first region 327 side, a large part (for example, 90% or more) of the second region 328 is a flat surface. On the third surface 325a, for example, a coated part at the time of forming a rough surface using, for example, the sand blasting method, remains as a flat surface.

Figure 13:
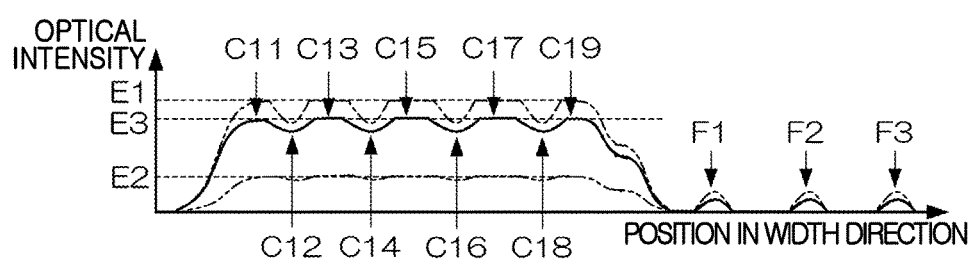
FIG. 13 is a diagram illustrating an example of a measurement result of intensity of light arriving at a medium of the modified example.

FIG. 13 illustrates an example of a measurement result of intensity of light arriving at a medium 200 of the present modified example. In FIG. 13, a vertical axis represents optical intensity, and a horizontal axis represents a position on the medium 200 (a two-dot chain line indicates optical intensity when the third surface illustrated in FIG. 11A is a flat surface) similarly to FIGS. 11A and 11B. In this example, optical intensity in the regions C11, C13, C15, C17, and C19 is E3. In the transmission member 322a, a portion of irradiation light, which is refracted on the first surface 323, is refracted on the second highs and lows 39a provided on the third surface 325a. Thus, optical intensity E3 is smaller than the optical intensity E1 in the example of FIG. 11A in which the whole third surface is a flat surface. However, since a large part of the third surface 325a is a flat surface, the optical intensity E3 is larger than optical intensity E2 in the example of FIG. 11B in which the second highs and lows 39a are provided on the whole third surface.

In this way, in the present modified example, intensity of light arriving at the irradiation target is stronger when compared to a case in which the second highs and lows are provided on the whole third surface, and a variation in intensity of light from the light source arriving at the irradiation target according to position is suppressed when compared to a case in which the whole third surface is a flat surface. In present modified example, a proportion of a region of a flat surface to the second region 328 may be different from that in an example illustrated in FIG. 12. For example, even when a flat surface is smaller than that in the transmission member 322a, at least a larger amount of irradiation light exits from a region of the flat surface toward the optical path R2 when compared to a case in which the second highs and lows are provided on the whole third surface, and thus intensity of light arriving at the irradiation target becomes stronger.

[2-2] Direction of First Surface

A transmission member may have a first surface, a direction of which is different from that in Example.

Figure 14:
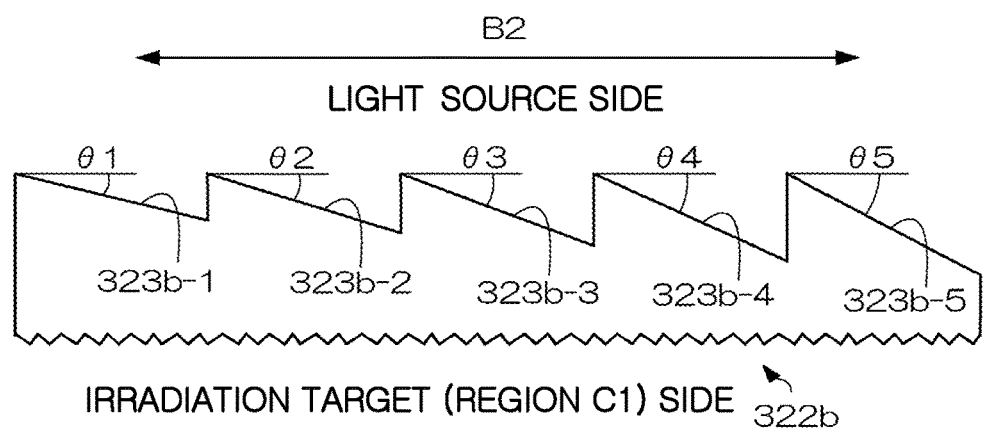
FIG. 14 is a diagram illustrating a transmission member of a modified example.

FIG. 14 illustrates a transmission member 322b of the present modified example. The transmission member 322b has a first surface 323b-1, a first surface 323b-2, a first surface 323b-3, a first surface 323b-4, and a first surface 323b-5 (referred to as "first surfaces 323b" when the respective surfaces are not distinguished). The first surfaces 323b are disposed side by side in the width direction B2 of the optical path at different angles with respect to the width direction B2.

The first surface 323b-1 forms an angle θ1 with the width direction B2, the first surface 323b-2 forms an angle θ2 with the width direction B2, the first surface 323b-3 forms an angle θ3 with the width direction B2, the first surface 323b-4 forms an angle θ4 with the width direction B2, and the first surface 323b-5 forms an angle θ5 with the width direction B2. These angles have a magnitude relation of θ1<θ2<θ3<θ4<θ5. The transmission member 322b is used together with a light source that radially emits light.

Figure 15:
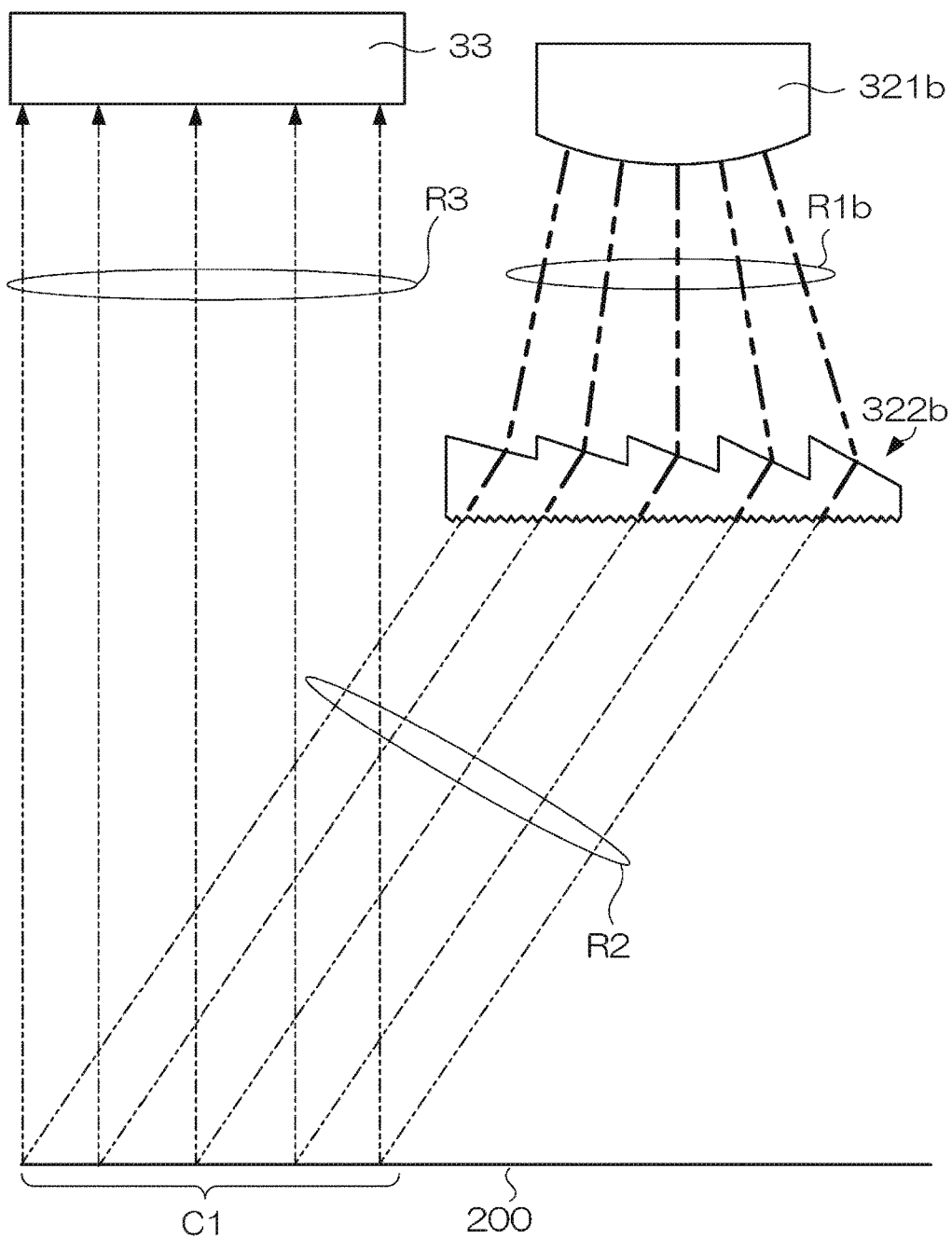
FIG. 15 is a diagram illustrating an example of an optical path of the modified example.

FIG. 15 illustrates an example of an optical path of the present modified example. FIG. 15 illustrates a light source 321b, the transmission member 322b, and an image capturing device 33. The light source 321b radially emits light. Irradiation light emitted from the light source 321b arrives at the transmission member 322b through an optical path R1b that radially widens. The transmission member 322b is disposed such that the first surface 323b-1 is on a side close to a region C1 corresponding to an irradiation target and the first surface 323b-5 is on a side far from the region C1.

Since the first surface 323b-1 forms a smallest angle with the width direction B2, irradiation light is refracted on first surface 323b-1 at a smallest angle. However, in radially traveling irradiation light, light that travels in a direction of most closely approaching the region C1 enters the first surface 323b-1, and thus the refracted light travels toward the optical path R2. On the contrary, since the first surface 323b-5 forms a largest angle with the width direction B2, irradiation light is refracted on first surface 323b-5 at a largest angle. However, in radially traveling irradiation light, light that travels in a direction in which light is farthest away from the region C1 enters the first surface 323b-5, and thus the refracted light travels toward the optical path R2. Similarly, light refracted on another first surface 323b travels toward the optical path R2.

As described above, each of the plural first surfaces 323b is provided in a direction that refracts radially traveling irradiation light from the light source 321b toward the region C1 corresponding to the irradiation target. In this way, even when a light source such as the light source 321b that radially emits light is used, intensity of light arriving at the irradiation target becomes stronger when compared to a case in which plural first surfaces is directed in the same direction.

[2-3] Roughness of Second Highs and Lows

Roughness of second highs and lows provided on a third surface may be different from that in Example. In Example, Pave (an average of intervals of the second highs and lows) is smaller than or equal to one tenth of the interval P1 of the first highs and lows 38. However, Pave may be larger than one tenth of the interval P1. In this case, a portion of light refracted by the second highs and lows in light entering the gap 326 arrives at the irradiation target, and a portion of irradiation light refracted on the first surfaces is refracted on the third surface, and thus non-uniformity of an irradiation distribution is suppressed when compared to a case in which the whole third surface is a flat surface.

Figure 16:
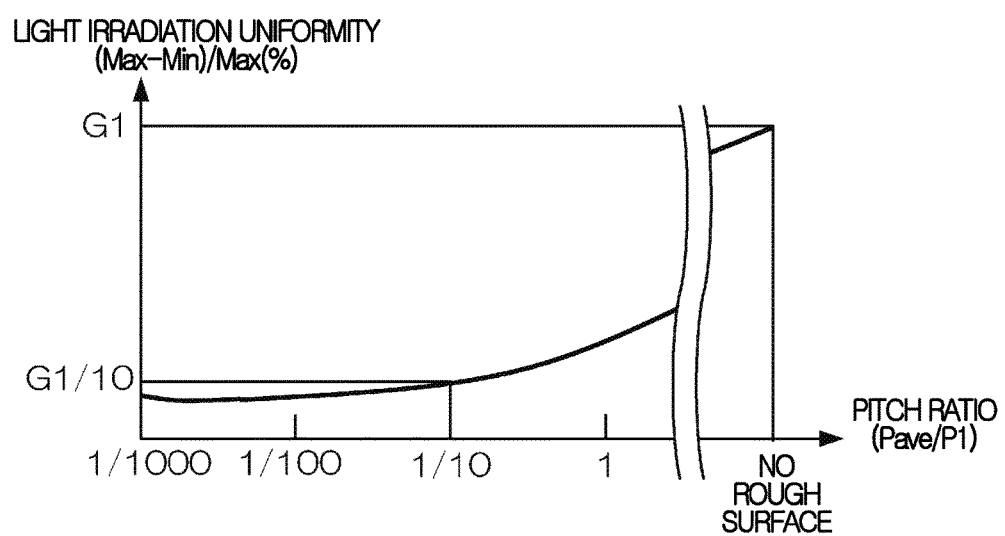
FIG. 16 is a diagram illustrating an example of a relation between a pitch ratio and light irradiation uniformity.

FIG. 16 illustrates an example of a relation between a pitch ratio and light irradiation uniformity. Light irradiation uniformity is a value obtained from maximum optical intensity (Max) and minimum optical intensity (Min) measured on an irradiation target ((Max−Min)/Max=Light irradiation uniformity, unit is %). As the value increases, an irradiation distribution is more non-uniform. A pitch ratio is a value obtained by dividing Pave by the interval P1. As this value decreases, a rough surface of a third surface is finer (an interval of second highs and lows is small). In FIG. 16, a vertical axis represents light irradiation uniformity, and a horizontal axis represents a pitch ratio.

In the example of FIG. 16, light irradiation uniformity is G1 which is a maximum when a rough surface is not present on the third surface. Further, as a rough surface provided on the third surface becomes finer, light irradiation uniformity becomes smaller (that is, an irradiation distribution becomes more uniform). When a pitch ratio is 1/10, light irradiation uniformity is one tenth of G1 (G1/10). Thereafter, a decreasing ratio of light irradiation uniformity at the time of decreasing a pitch ratio is smaller when compared to a case in which a pitch ratio is larger than 1/10. A pitch ratio is preferably small. However, to this end, a rough surface of the third surface needs to be made finer. As the rough surface is made finer, a higher-degree processing technology is needed. Further, processing cost easily increases. In this regard, it is preferable to set roughness at which a pitch ratio is 1/10 as a criterion as in Example since light irradiation uniformity efficiently decreases.

[2-4] Direction of Second Surfaces

A transmission member may have second surfaces, directions of which are different from those in Example.

Figure 17A:
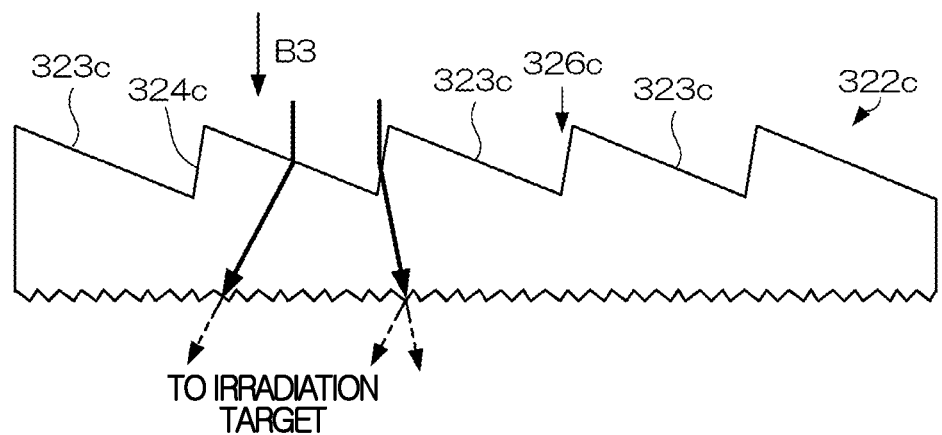
FIGS. 17A and 17B are diagrams illustrating an example of a transmission member of a modified example.
Figure 17B:
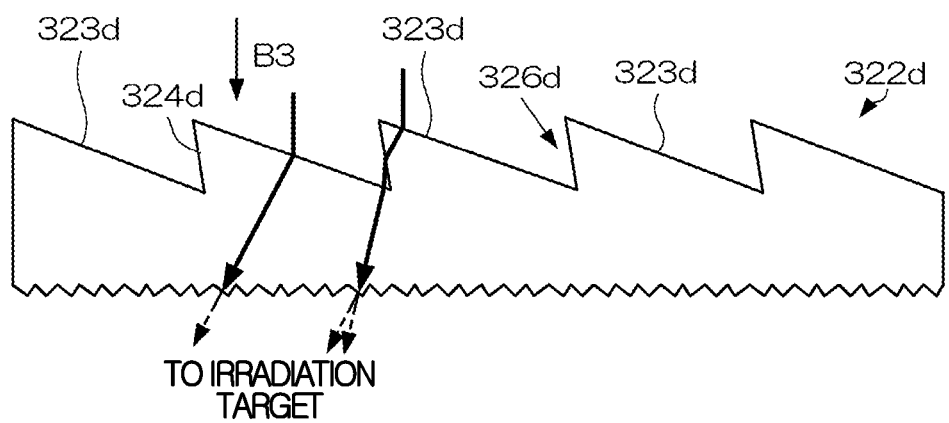

FIGS. 17A and 17B illustrate an example of a transmission member of the present modified example. FIG. 17A illustrates a transmission member 322c having plural first surfaces 323c and plural second surfaces 324c interposed among adjacent first surfaces 323c. The second surface 324c is a surface that forms an angle with a light travel direction B3 in which irradiation light travels rather than a surface along the light travel direction B3 as in Example. In addition, in the transmission member 322c, adjacent first surfaces 323c are separated from each other when viewed from the light source side.

For this reason, a second surface 324c is seen in a gap 326c between the adjacent first surfaces 323c when viewed from the light source side, and irradiation light enters the second surface 324c. In this case, irradiation light entering the second surface 324c is refracted in a direction away from an irradiation target as illustrated in the figure. For this reason, when a third surface is a flat surface, an irradiation distribution on the irradiation target is non-uniform as in Example illustrated in FIG. 11A. However, when a rough surface is provided on the third surface, a portion of light refracted on the rough surface is directed to the irradiation target, and thus non-uniformity is suppressed.

FIG. 17B illustrates a transmission member 322d having plural first surfaces 323d and plural second surfaces 324d interposed among adjacent first surfaces 323d. In the transmission member 322d, first surfaces 323d adjacent to each other overlap each other when viewed from the light source side. For this reason, a gap 326d between the adjacent first surfaces 323d is not seen from the light source side, and a second surface 324d is not seen therefrom. Thus, irradiation light enters neither the gap 326d nor the second surface 324d, and enters a first surface 323d.

A portion of irradiation light refracted on the first surface 323d is refracted on a second surface 324d again, and then enters an adjacent first surface 323d. The entering light is not light that travels in the light travel direction B3, and thus easily travels in a direction shifted from the irradiation target even when the light is refracted on the first surface 323d. For this reason, when a third surface is a flat surface, an irradiation distribution on the irradiation target is non-uniform as in Example illustrated in FIG. 11A. However, when a rough surface is provided on the third surface, a portion of light refracted on the rough surface is directed to the irradiation target, and thus non-uniformity is suppressed.

In the example of FIG. 17A, non-uniformity is suppressed by providing second highs and lows in a region of the third surface from which light entering the second surface in the gap between the adjacent first surfaces exits. In addition, in the example of FIG. 17B, non-uniformity is suppressed by providing second highs and lows in a region from which light, which enters the first surface, exits from the second surface, and enters the first surface again, exits.

[2-5] Position of Second Highs and Lows

In a transmission member, second highs and lows may be provided at a different position from that in the example of FIG. 12.

Figure 18:
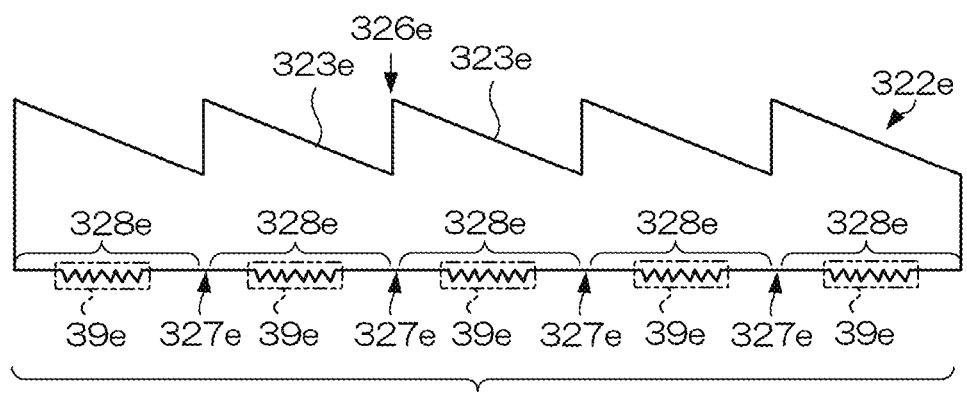
FIG. 18 is a diagram illustrating a transmission member of a modified example.

FIG. 18 illustrates a transmission member 322e of the present modified example. The transmission member 322e has plural first surfaces 323e and a third surface 325e. In the third surface 325e, second highs and lows are not provided in a first region 327e from which light entering a gap 326e between adjacent first surfaces 323e exits, and second highs and lows 39e are provided in a second region 328e other than the first region 327e.

In this case, in irradiation light refracted on a first surface 323e and directed to the irradiation target, a portion of light exiting from a region in which the second highs and lows 39e are provided is refracted to exit in a direction which is not toward the irradiation target. As a result, intensity of light measured in the regions C11, C13, C15, C17, and C19 at which light refracted on the first surface 323x illustrated in FIGS. 11A and 11B arrives is smaller than the optical intensity E1 illustrated in FIG. 11A, and non-uniformity of an irradiation distribution is suppressed when compared to a case in which the whole third surface is a flat surface.

[2-6] Shape of Second Highs and Lows

In a transmission member, second highs and lows having a different shape from that in the example of FIG. 12 may be provided.

Figure 19:
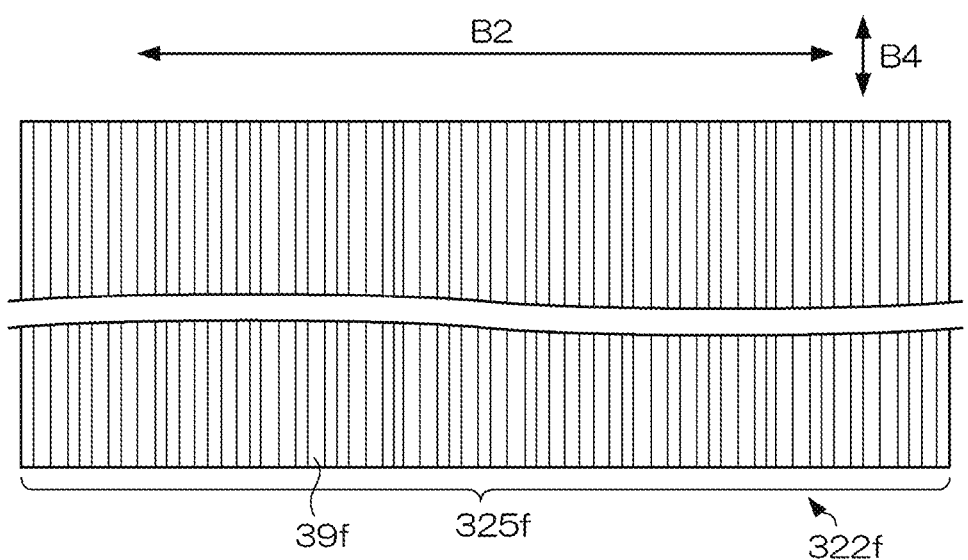
FIG. 19 is a diagram illustrating a transmission member of a modified example.

FIG. 19 illustrates a transmission member 322f of the present modified example. The transmission member 322f has a third surface 325f. Second highs and lows 39f are provided on the third surface 325f. The second highs and lows 39f are formed by arranging and digging grooves along a direction B4 orthogonal to a width direction B2 of an optical path in which first surfaces (not illustrated) are arranged side by side, and have a shape in which highs and lows alternately appear along the width direction B2 (a shape of a wave). In this case, a portion of irradiation light exiting from the third surface 325f is refracted, and non-uniformity of an irradiation distribution is suppressed when compared to a case in which the whole third surface is a flat surface.

[2-7] Shape of Surface

Shapes of a first surface, a second surface, and a third surface are not limited to the above-described shapes. For example, the first surface may be a curved surface such as a convex lens. In this case, an optical path on the irradiation target side is narrower than an optical path on the light source side, and a narrower region is irradiated with light when compared to a case in which each surface is a flat surface. On the contrary, when the first surface is a curved surface such as a concave lens, a wider region is irradiated with light when compared to a case in which each surface is a flat surface. In other words, each surface may have any shape when the surface refracts light such that irradiation light from the light source is guided up to the irradiation target.

[2-8] Number of First Surfaces

In Example, the transmission member has five first surfaces. However, the invention is not limited thereto. The transmission member may have four or fewer first surfaces or six or more first surfaces. However, the transmission member needs to have at least two or more first surfaces (one or more second surfaces). In this way, a device may be miniaturized when compared to a case in which one reflecting surface is disposed on an optical path similarly to Example.

[2-9] Application Range of the Invention

The transmission member and the irradiation device of the invention may be used for a device in addition to the electronic pen. For example, the transmission member and the irradiation device may be used as a lighting system of a microscope, a lighting system for surgical operations, and the like and may be used as an optical system of a spectacle type display device. A light source in the latter case is a projecting device that projects light representing an image. In other words, the transmission member and the irradiation device of the invention may be used for any device when the device uses an optical system in which a travel direction of light emitted by a light source is directed toward an irradiation target.

What is claimed is:

1. A transmission member for a pen, the transmission member comprising:
    a plurality of first surfaces disposed side by side in a width direction of an optical path from a light source to an irradiation target, the plurality of first surfaces refracting light from the light source entering each of the first surfaces in a direction toward the irradiation target;
    a plurality of second surfaces, each interposed between each of the first surfaces adjacent to each other to form respective first highs and lows together with the adjacent first surfaces; and
    a third surface with an exit area from which light refracted on the first surfaces passes through and exits the transmission member, the exit area having a plurality of first areas and a plurality of second areas in the width direction, each of the first areas having second highs and lows at a smaller interval than an interval of the first highs and lows, and each of the plurality of second areas being flat, each first area of the plurality of first areas being separated from another first area by one second area of the plurality of second areas, each of the first areas being aligned with a corresponding second surface of the plurality of second surfaces with respect to the optical path from the light source, and each of the second areas being aligned with a corresponding first surface of the plurality of first surfaces with respect to the optical path from the light source.

2. The transmission member according to claim 1, wherein the second highs and lows are provided in each of the plurality of first areas of the third surface from which light entering a gap between the adjacent first surfaces exits.

3. The transmission member according to claim 2, wherein
    the light source emits radially traveling light, and
    each of the plurality of first surfaces refracts the radially traveling light in a direction toward the irradiation target.

4. The transmission member according to claim 1, wherein
    the light source emits radially traveling light, and
    each of the plurality of first surfaces refracts the radially traveling light in a direction toward the irradiation target.

5. An irradiation device comprising:
    the transmission member according to claim 1; and
    a light source that irradiates the transmission member with light.

6. An electronic pen comprising:
    the irradiation device according to claim 5;
    a pen point;
    an image capturing device that captures an image of a region based on light emitted to a medium by the irradiation device and reflected in the region on the medium at a position corresponding to a contact position at which the pen point contacts with the medium; and
    a processing device that performs a process with respect to the image captured by the image capturing device.

7. The transmission member according to claim 1, wherein a distance in the width direction between each of the plurality of first areas of the third surface is constant.

8. A transmission member for a pen, the transmission member comprising:
    a plurality of first surfaces disposed side by side in a width direction of an optical path from a light source to an irradiation target, the plurality of first surfaces refracting light from the light source entering each of the first surfaces in a direction toward the irradiation target;
    a plurality of second surfaces, each interposed between each of the first surfaces adjacent to each other to form respective first highs and lows together with the adjacent first surfaces; and
    a third surface with an exit area from which light refracted on the first surfaces passes through and exits the transmission member, the exit area having a plurality of first areas and a plurality of second areas in the width direction, each of the first areas having second highs and lows at a smaller interval than an interval of the first highs and lows, each of the plurality of second areas being flat, each first area of the plurality of first areas being separated from another first area by one second area of the plurality of second areas, each of the second areas being aligned with a corresponding second surface of the plurality of second surfaces with respect to the optical path from the light source, and each of the first areas being aligned with a corresponding first surface of the plurality of first surfaces with respect to the optical path from the light source.

* * * * *